Patented Oct. 30, 1945

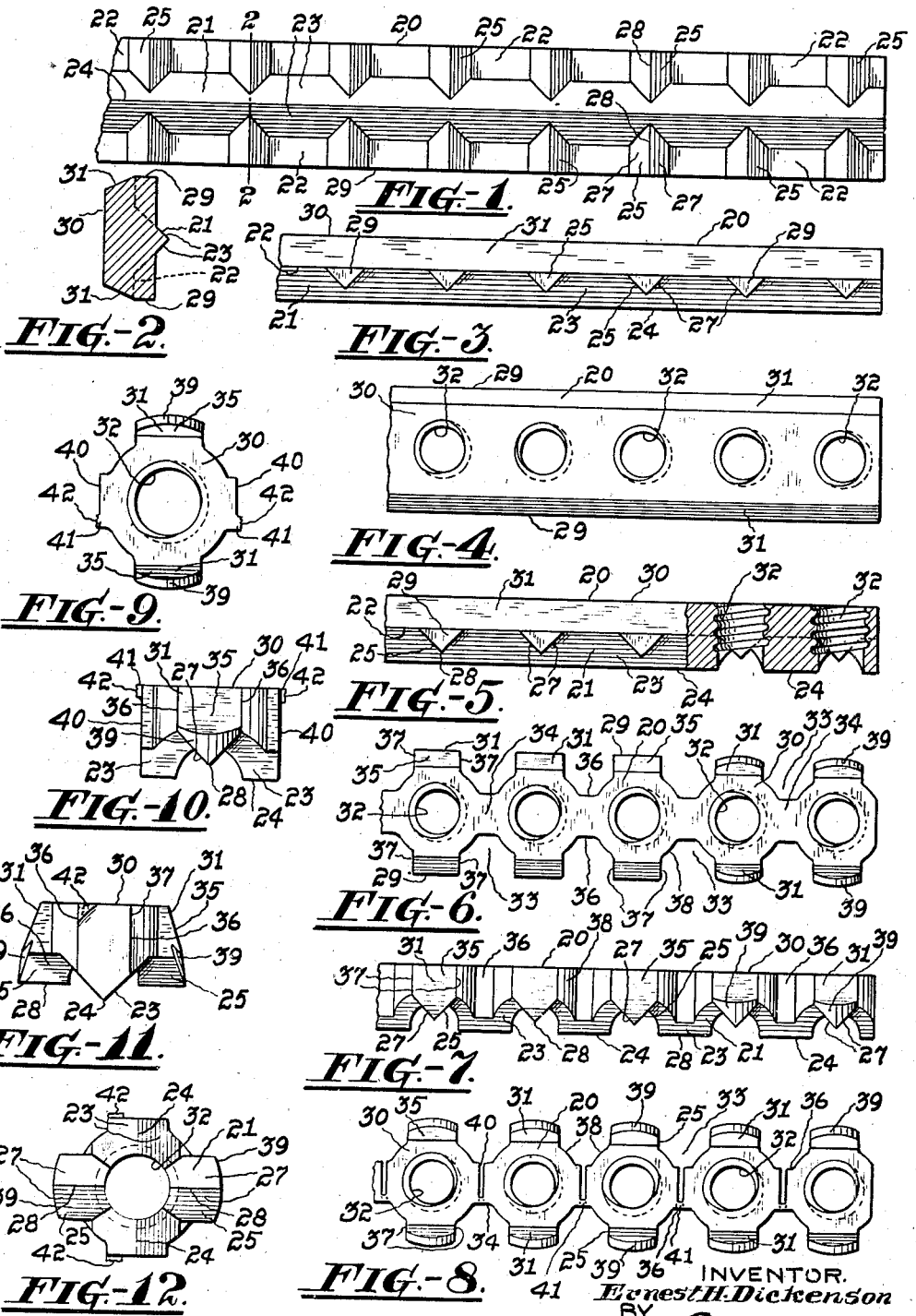

2,387,983

UNITED STATES PATENT OFFICE 2,387,983

MANUFACTURE OF DETACHABLE DRILL BITS

Ernest H. Dickenson, New York, N. Y., assignor to Ingersoll-Rand Company, New York, N. Y., a corporation of New Jersey Application October 25, 1943, Serial No. 507,547

8 Claims. (Cl. 76—108)

This invention relates to drill bits for drilling rock and like materials, and more particularly to a method of manufacturing rock drill bits of the detachable type.

Heretofore, in the manufacture of this type of drill bits, it has been customary to forge the bits individually from blanks of material and to set them up singly on the machines performing the several finishing operations, such as grinding, drilling and tapping when required, and forming the gauge surfaces on the wing tips of the drill bits. This mode of manufacture, moreover, involved a considerable expense in repeatedly handling the bits for transportation from one machine to another and in placing them individually in shipping containers.

It is accordingly an object of the present invention to reduce the cost of production of drill bits of the detachable type.

A further object is to increase the rate of production of bits of this type.

Another object is to minimize the work of handling the bits at all stages of the process of manufacture thereof.

Other objects will be in part obvious and in part pointed out hereinafter.

In the drawing accompanying this specification and in which similar reference numerals refer to similar parts:

Figure 1 is a plan view of a metal bar having cutting teeth, such as are commonly formed on drill bits, formed along one side thereof;

Figure 2 is a transverse view taken through Figure 1 on the line 2—2,

Figure 3 is a side view of the bar shown in Figure 1,

Figure 4 is a plan view of the reverse side of the bar illustrated in Figure 1 showing a plurality of threaded holes in spaced relation with respect to each other along the length of the bar, Figure 5 is a side view, partly broken away, of the bar as illustrated in Figure 4, Figure 6 is a top plan view of the bar as it appears after the sides of the bar adjacent the cutting teeth have been recessed to define certain essential features of the drill bits;

Figure 7 is a side view of the bar illustrated in Figure 6,

Figure 8 is a top plan view of the bar after all the essential features of the drill bits have been formed thereon and showing the bar slotted part way through between adjacent bits, Figure 9 is an enlarged top plan view of a single, completely machined drill bit, Figure 10 is a side elevation of a drill bit showing more particularly the side view of the gauge surface on the end of a cutting wing;

Figure 11 is another side elevation of the drill bit taken at a right angle to the view shown in Figure 10; and Figure 12 is a plan view of the cutting end of a completely machined drill bit.

Referring more particularly to the drawing, and at first to Figures 1, 2 and 3, a metal bar 20 of parent stock from which it is contemplated to form the detachable drill bits is shown as it appears, say, after its final pass through a rolling mill.

In the form shown, for illustrative purposes, the bar has a central rib 21 extending longitudinally along one side 22 thereof. The rib 21 is of V-shape, its sides 23 being inclined and converging in the center of the bar to provide a cutting edge 24 that extends unbrokenly along the length of the bar.

On the same side of the bar and at equally spaced points along its length are ribs or cuttting teeth 25 that lie on opposite sides of the rib 21 and extend from the rib 21 to the side edges of the bar.

The ribs 25 are also of V-shape having inclined sides 27 that converge to form cutting edges 28 normal to the cutting edge 24. The ribs 25 are shown as being of less height than the rib 21 so that, during the use of a drill bit, the cutting edge or edges 24 will lead the cutting edges 28 to serve as a pilot portion for the drill bit.

During the reduction of the metal to the form of bar shown the outer end surfaces 29 of the ribs 25 may be formed substantially at right angles to the cutting edges 28 and the rearward surface of the bar be formed in parallelism with the side 22 to provide seating surfaces 30 for drill rods to which drill bits of the detachable type are connected for use with a rock drill. The side surfaces 31 of the bar leading from the end surfaces 29 to the surface 30 are suitably inclined to limit the width of the surface 30 to that required for a correct area of contact between a surface 30 of a completed drill bit and the cooperating surface of a drill rod.

As another step in the method of manufacturing drill bits from the bar 20, said bar is provided with means suitable for connection to a drill rod, as by forming therein a plurality of threaded holes 32 that are located at the points of intersection of the planes of the cutting edges 28 with the cutting edge 24. This step is expeditiously carried out by drilling and tapping a plurality of holes 32 with multi-tool machines and will materially reduce the unit cost below that of drilling and tapping the bits singly, as has been the practice heretofore.

Upon completion of the drilling and tapping operation the sides 31 of the bar may next be machined, as with a gang of milling cutters, to form therein recesses 33 between ribs 25. The recesses 33 extend only part way into the bar and between the inner ends of opposed recesses are bridge portions 34 that overlie the rib 21. The outer ends of the recesses extend from one tooth 25 to another and thus define buttresses 35 for the said cutting teeth. In like manner the bridge portions 34 will also serve as buttresses for the portions of the rib 21 lying in the transverse planes of the recesses 33.

The bottom surfaces 36 of the recesses 33 forming the sides of the bridge portions 34 are of less width than the outer ends of the recesses and are joined to the side surfaces 37 of the buttresses 35 by curved surfaces 38. The surfaces 38 are described from the axes of the threaded holes 32 and lie inside of the outer ends of the teeth 25 to provide suitable clearances for the passage of rock cuttings along the sides of the drill bits. The operation of forming the recesses 33 may also be carried out with a multi-tool machine and, therefore, with a minimum expenditure of time.

The same procedure may be followed for shaping the ends of the laterally extending cutting teeth 25 to form thereon gauge surfaces 39. The gauge surfaces may be inclined as illustrated, more particularly in Figure 11 of the drawing, or be in parallelism with respect to the axis of the drill bit, as desired.

After the gauge surfaces have been thus formed the drill bits are cut into the correct lengths endwise of the bar by forming slots 40 in the bridge portions 34. As a preferred arrangement, the slots 40 are formed only part way through the bridge portions so that a connecting link 41 of metal will remain between adjacent drill bits for maintaining a group thereof in bar form. They may thus be handled conveniently in groups instead of individually as heretofore for such other operations as grinding the cutting edges and heat treatment.

The links 41 are of only sufficient strength to enable the work to retain its identity as a bar but may be readily broken for separating a bit from a bar for use. In thus breaking the connecting links 41 portions 42 thereof will, of course, remain on the drill bits, but since the span between the slots 40 is smaller than the distance across the cutting edges 28 these protuberances will not engage the wall of the hole being drilled and cannot, therefore, impose an unnecessary drag upon the rotation mechanism of a rock drill.

At this point in the process of manufacture it may be desirable to cut the bar into shorter lengths each including a definite number of bits for convenience in handling, and in such case certain of the slots 40 may be extended completely through the bar to form the desired lengths. By maintaining groups of bits in bar form of suitable length the bits may also be expeditiously packed or tied in bundles for shipment.

As will be readily understood, the forming of the slots 40 in the bridge portions 34 may also be conveniently accomplished by a gang of slitting tools and this work may, of course, be performed in the same period of time that would be required for cutting only one bit from the bar.

From the foregoing description it will be apparent that the manufacture of drill bits of the detachable type may be greatly expedited and the cost thereof be reduced materially through the use of parent stock and by simultaneously machining and treating groups of drill bits in bar form instead of singly. The same is, of course, true also of the cost of transporting the bits from one point to another in the factory for such work as grinding, heat treating and preparing them for shipment from the factory. A further highly desirable advantage of maintaining groups of completed bits in bar form is that they are less likely to become lost in the muck usually present in the vicinity of a drilling operation than is a comparatively small individual bit.

Although, as has been indicated herein the parent stock for the drill bits may be produced upon a rolling mill, it should be understood that it may be produced otherwise, as by forging, and that essential portions of a drill bit other than those shown may be impressed upon the parent stock instead of being formed by separate machining operations.

It is also to be understood that the special form or arrangement of cutting teeth shown is merely by way of example and that others within the scope of the invention will suggest themselves to those skilled in the related art.

I claim:

1. In a method of manufacturing drill bits of the detachable type from a metal bar, the steps of forming a plurality of groups of cutting teeth along one side of the bar, forming recesses in two opposed sides of the bar to define buttress portions on the bar for the cutting teeth, and cutting the bar between adjacent groups of cutting teeth and in the transverse planes of the recesses for dividing the bar into drill bit lengths.

2. The method of manufacturing drill bits of the detachable type from a metal bar which comprises the forming of a plurality of groups of cutting teeth along one side of the bar, forming opposed recesses in the bar between adjacent groups of teeth to define buttress portions for the cutting teeth, forming means on the bar adjacent each group of cutting teeth for the accommodation of the connecting element of a drill rod, and forming slots transversely part way through the bar in the planes of the opposed recesses to divide the bar into a plurality of readily separable drill bits.

3. In a method of manufacturing drill bits of the detachable type from a metal bar, the steps of forming a plurality of groups of cutting teeth along one side of the bar, forming threaded holes along the length of the bar centrally of each group of cutting teeth, forming recesses in two opposed sides of the bar between adjacent groups of cutting teeth to define buttress portions for the cutting teeth and bridges between adjacent groups of cutting teeth, and cutting transversely through the bridges for dividing the bar into drill bit lengths.

4. In a method of manufacturing drill bits of the detachable type from a metal bar, the steps of forming a plurality of groups of cutting teeth along one side of the bar, forming threaded holes along the length of the bar centrally of each group of cutting teeth, recessing the sides of the bar adjacent said one side to define buttress portions for the cutting teeth, and slotting the bar transversely between adjacent groups of cutting teeth to divide said bar into a plurality of portions of equal length.

5. In a method of manufacturing drill bits of the detachable type from a metal bar, the steps of forming a plurality of groups of cutting teeth along one side of the bar, forming threaded holes along the length of the bar centrally of each group of cutting teeth, forming recesses in the opposed sides of the bar adjacent said one side to form chip clearances, forming gauge surfaces on the ends of certain of the cutting teeth, and cutting the bar between adjacent groups of teeth to divide the bar into a plurality of portions each of equal length.

6. The method of manufacturing drill bits of the detachable type from a metal bar which comprises the forming of a plurality of groups of cutting teeth along one side of the bar, forming threaded holes along the length of the bar centrally of each group of cutting teeth, forming recesses in the opposed surfaces of the bar adjacent said one side to define chip clearances and to define buttress portions for the cutting teeth, forming gauge surfaces on the ends of the teeth projecting from the sides of the bar, and forming slots part way through the bar between adjacent groups of teeth to partly divide the bar into drill bits and to define a readily breakable connecting link of metal between adjacent drill bits.

7. The method of manufacturing drill bits of the detachable type from a metal bar which comprises the forming of cutting teeth along one side of the bar and a seating surface on the opposite side of the bar, forming a plurality of relatively spaced means along the length of the bar to accommodate the connecting element of a drill rod, contouring the opposed sides of the bar adjacent said one side to define the chip clearances in the sides of the drill bits, and cutting across the bar between the said means to divide the bar into drill bits of substantially equal areas of cutting teeth and substantially equal areas of seating surfaces.

8. The method of manufacturing drill bits of the detachable type from a bar of metal which comprises the forming of cutting teeth along the length of the bar on one side thereof, forming the side contours of the drill bits in the opposed sides of the bar adjacent the said one side, forming means on the bar adjacent each group of cutting teeth for the accommodation of the connecting element of a drill rod, and cutting across the bar at a plurality of relatively spaced points in one operation to divide the bar into drill bits of substantially equal areas of cutting teeth.

ERNEST H. DICKENSON.